(12) United States Patent
Sridharan et al.

(10) Patent No.: US 12,177,018 B2
(45) Date of Patent: Dec. 24, 2024

(54) PUCCH/PUSCH DMRS BUNDLING DURATION

(71) Applicant: QUALCOMM Incorporated, San Diego, CA (US)

(72) Inventors: Gokul Sridharan, Sunnyvale, CA (US); Peter Gaal, San Diego, CA (US); Tao Luo, San Diego, CA (US); Mahmoud Taherzadeh Boroujeni, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/648,116

(22) Filed: Jan. 14, 2022

(65) Prior Publication Data
US 2022/0231791 A1    Jul. 21, 2022

Related U.S. Application Data

(60) Provisional application No. 63/138,657, filed on Jan. 18, 2021.

(51) Int. Cl.
*H04L 1/08* (2006.01)
*H04L 5/00* (2006.01)
(Continued)

(52) U.S. Cl.
CPC .............. *H04L 1/08* (2013.01); *H04L 5/0044* (2013.01); *H04L 5/0051* (2013.01);
(Continued)

(58) Field of Classification Search
CPC ... H04L 1/00; H04L 1/08; H04L 5/003; H04L 5/0048; H04L 5/0051; H04L 5/00;
(Continued)

(56) References Cited

U.S. PATENT DOCUMENTS

| | | | |
|---|---|---|---|
| 11,310,088 B2 * | 4/2022 | Ly | H04L 27/2613 |
| 2019/0313436 A1 * | 10/2019 | Lee | H04L 5/0051 |

(Continued)

OTHER PUBLICATIONS

International Search Report and Written Opinion—PCT/US2022/012813—ISA/EPO—May 16, 2022 20 pages.
(Continued)

*Primary Examiner* — Warner Wong
(74) *Attorney, Agent, or Firm* — Procopio, Cory, Hargreaves & Savitch

(57) ABSTRACT

This disclosure provides systems, devices, apparatus, and methods, including computer programs encoded on storage media, for PUCCH/PUSCH DMRS bundling. A UE may transmit, to a network entity, a first indication of a maximum DMRS bundling duration for maintaining transmit phase coherence for transmitted DMRS. The UE may receive, from the network entity based on the first indication of the maximum DMRS bundling duration, a second indication of at least one of a DMRS bundling activation or a DMRS bundling duration. Based on the at least one of the DMRS bundling activation or the DMRS bundling duration, the UE may transmit at least one UL repetition including bundled DMRS.

30 Claims, 12 Drawing Sheets

(51) Int. Cl.
*H04W 72/1268* (2023.01)
*H04W 72/23* (2023.01)
*H04L 1/1812* (2023.01)
*H04W 4/20* (2018.01)
*H04W 80/00* (2009.01)

(52) U.S. Cl.
CPC ....... *H04W 72/1268* (2013.01); *H04W 72/23* (2023.01); *H04L 1/1812* (2013.01); *H04W 4/20* (2013.01); *H04W 80/00* (2013.01)

(58) Field of Classification Search
CPC ... H04L 5/0044; H04L 47/827; H04L 67/566; H04L 67/1046; H04L 1/1812; H04W 72/00; H04W 72/11; H04W 72/14; H04W 72/12; H04W 72/1263; H04W 72/1268; H04W 28/02; H04W 28/0273; H04W 28/10; H04W 72/20; H04W 4/20; H04W 56/00; H04W 56/001; H04W 80/00–12
See application file for complete search history.

(56) References Cited

U.S. PATENT DOCUMENTS

| | | | |
|---|---|---|---|
| 2020/0221474 A1* | 7/2020 | Lee | H04W 72/23 |
| 2020/0403748 A1* | 12/2020 | Yokomakura | H04L 5/0048 |
| 2020/0403768 A1 | 12/2020 | Manolakos et al. | |
| 2020/0412515 A1* | 12/2020 | Xu | H04W 4/70 |
| 2021/0028899 A1* | 1/2021 | Medles | H04L 5/0048 |
| 2022/0061067 A1 | 2/2022 | Andersson et al. | |
| 2022/0104227 A1* | 3/2022 | Sridharan | H04W 72/1268 |
| 2022/0191081 A1* | 6/2022 | Kim | H04L 5/0094 |
| 2022/0225240 A1* | 7/2022 | Fakoorian | H04W 72/21 |
| 2022/0231899 A1* | 7/2022 | Khoshnevisan | H04L 1/18 |
| 2022/0239410 A1* | 7/2022 | Lim | H04W 72/23 |
| 2023/0033400 A1* | 2/2023 | Maso | H04L 5/0053 |
| 2023/0111395 A1* | 4/2023 | Li | H04L 5/14 370/329 |
| 2023/0179369 A1* | 6/2023 | Xu | H04L 5/0094 370/336 |
| 2024/0007247 A1* | 1/2024 | Ly | H04L 5/0094 |
| 2024/0015707 A1* | 1/2024 | Ly | H04L 1/1893 |

OTHER PUBLICATIONS

Moderator (China Telecom): "FL Summary of Joint Channel Estimation for PUSCH", 3GPP TSG RAN WG1 Meeting #104bis-e, R1-2103808, 3rd Generation Partnership Project, Mobile Competence Centre, 650, Route Des Lucioles, F-06921 Sophia-Antipolis Cedex, France, vol. RAN WG1, No. E-Meeting, Apr. 12, 2021-Apr. 20, 2021, Apr. 13, 2021, XP051995267, 30 Pages, p. 19-22, p. 7-8.

Moderator (NTT Docomo), et al., "Summary on UE Features for NR Coverage Enhancement", 3GPP TSG RAN WG1 #106bis-e, R1-2109714, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 19, 2021, XP052062113, 40 Pages.

Moderator (Qualcomm): "FL Summary #2 of PUCCH Coverage Enhancement", 3GPP TSG RAN WG1 #103-e, R1-2009405, 3rd Generation Partnership Project, Mobile Competence Centre, 650, Route Des Lucioles, F-06921 Sophia-Antipolis Cedex, France, vol. RAN W61, No. e-Meeting, Oct. 26, 2020-Nov. 13, 2020, Oct. 30, 2020, XP051948670, 37 Pages.

Xiaomi: "Joint Channel Estimation for PUSCH", 3GPP TSG RAN WG1 #104b-e, R1-2102994, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, XP051993339, 7 Pages.

* cited by examiner

PUCCH/PUSCH DMRS BUNDLING DURATION

CROSS REFERENCE TO RELATED APPLICATION(S)

This application claims the benefit of and priority to U.S. Provisional Application Ser. No. 63/138,657, entitled "PUCCH/PUSCH DMRS BUNDLING DURATION" and filed on Jan. 18, 2021, which is expressly incorporated by reference herein in its entirety.

TECHNICAL FIELD

The present disclosure relates generally to communication systems, and more particularly, to a physical uplink control channel (PUCCH)/physical uplink shared channel (PUSCH) demodulation reference signal (DMRS) bundling duration.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may transmit, to a network entity, a first indication of a maximum demodulation reference signal (DMRS) bundling duration for maintaining transmit phase coherence for transmitted DMRS; receive, from the network entity based on the first indication of the maximum DMRS bundling duration, a second indication of at least one of a DMRS bundling activation or a DMRS bundling duration; and transmit at least one uplink (UL) repetition including bundled DMRS based on the at least one of the DMRS bundling activation or the DMRS bundling duration.

In another aspect of the disclosure, a method, a computer-readable medium, and an apparatus are provided. The apparatus may receive, from a user equipment (UE), a first indication of a maximum DMRS bundling duration associated with a phase coherence for received DMRS; transmit, to the UE based on the first indication of the maximum DMRS bundling duration, a second indication of at least one of a DMRS bundling activation or a DMRS bundling duration; and receive at least one UL repetition including bundled DMRS based on the at least one of the DMRS bundling activation or the DMRS bundling duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
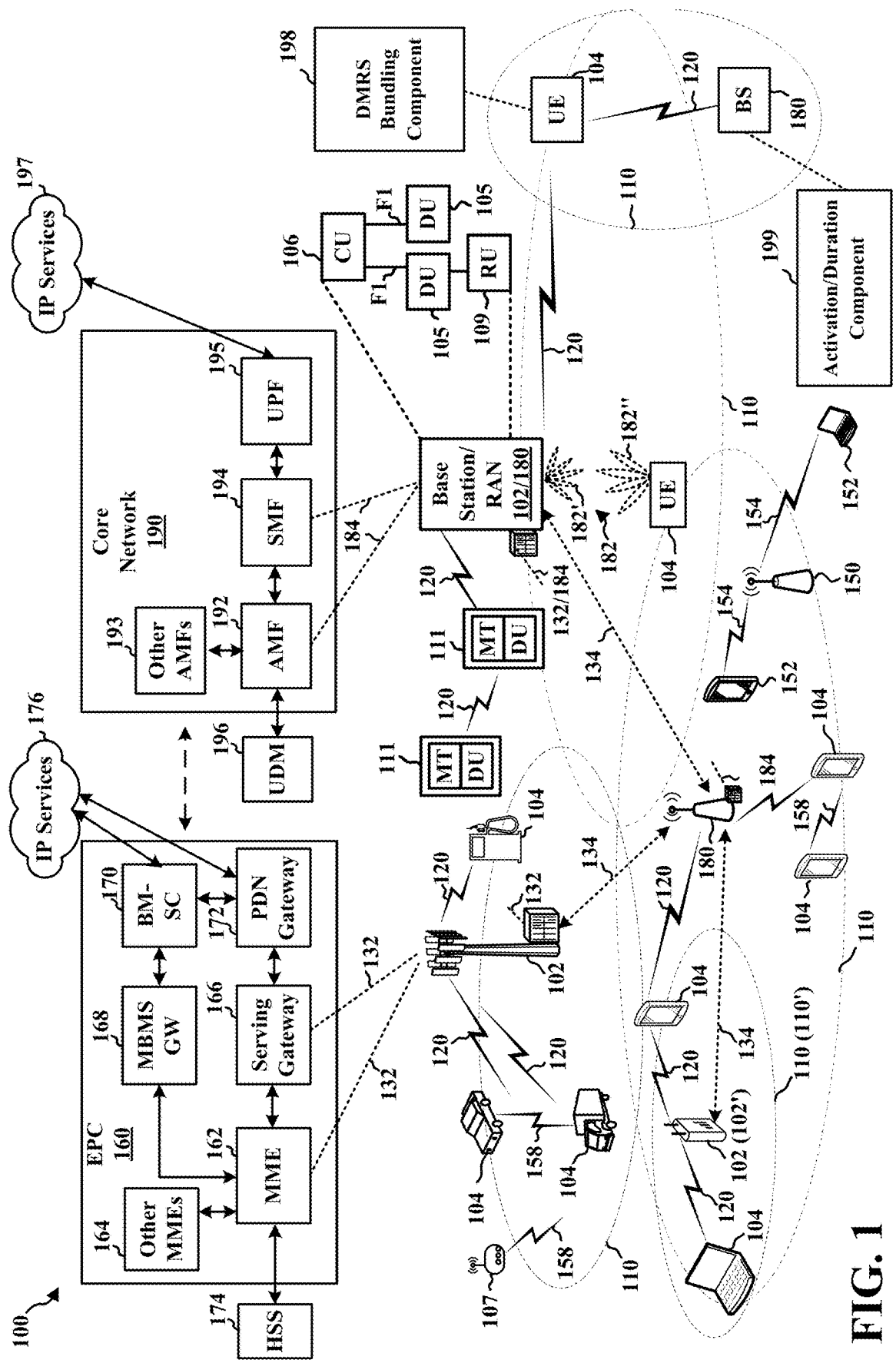
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range (FR) designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A network entity, which may also be referred to as a network node, may include a base station, one or more components of a disaggregated or virtualized base station (e.g., a DU 105 or a CU 106), an RU 109, a TRP, a relay, an intelligent reflective surface (IRS), etc.

Referring again to FIG. 1, in certain aspects, the UE 104 may include a demodulation reference signal (DMRS) bundling component 198 configured to transmit, to a network entity, a first indication of a maximum DMRS bundling duration for maintaining transmit phase coherence for transmitted DMRS; receive, from the network entity based on the first indication of the maximum DMRS bundling duration, a second indication of at least one of a DMRS bundling activation or a DMRS bundling duration; and transmit at least one UL repetition including bundled DMRS based on the at least one of the DMRS bundling activation or the DMRS bundling duration. In certain aspects, the base station 180 may include an activation/duration component 199 configured to receive, from a UE, a first indication of a maximum DMRS bundling duration associated with a phase coherence for received DMRS; transmit, to the UE based on the first indication of the maximum DMRS bundling duration, a second indication of at least one of a DMRS bundling activation or a DMRS bundling duration; and receive at least one UL repetition including bundled DMRS based on the at least one of the DMRS bundling activation or the DMRS bundling duration. Although the following description may be focused on 5G NR, the concepts described herein may be applicable to other similar areas, such as LTE, LTE-A, CDMA, GSM, and other wireless technologies.

Figure 2:
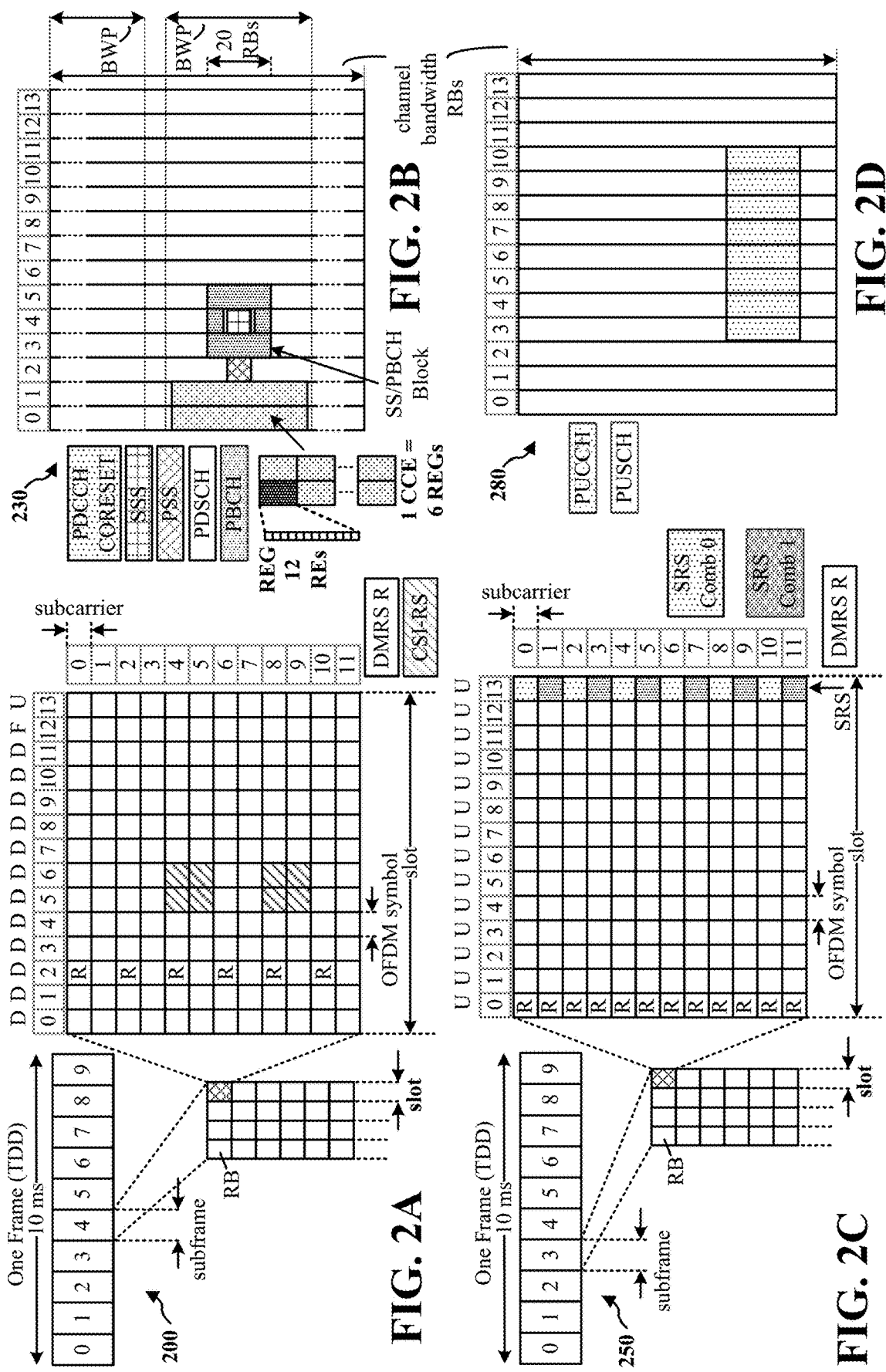
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[\text{kHz}]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
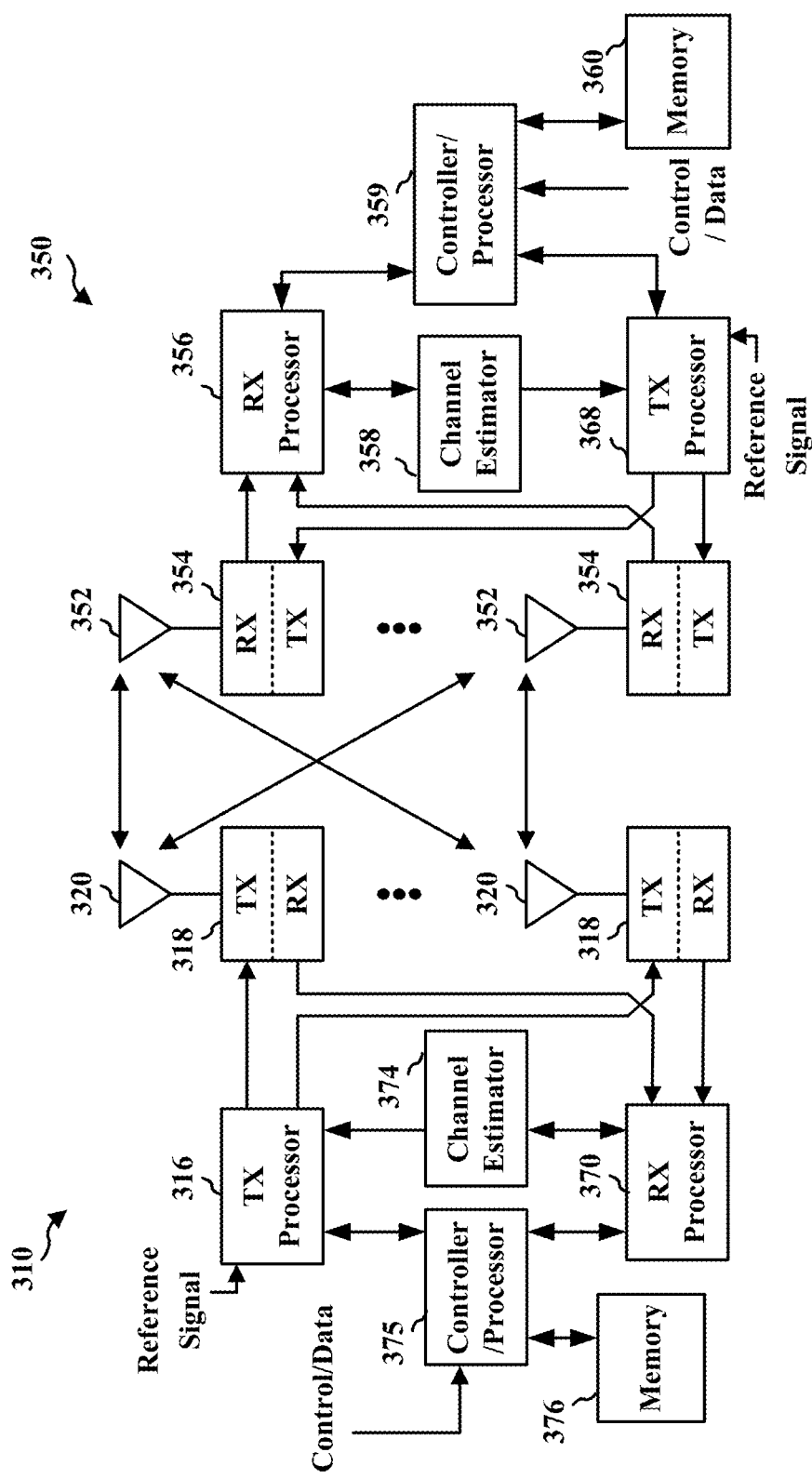
FIG. 3 is a diagram illustrating an example of a network entity (e.g., base station) and user equipment (UE) in an access network.

FIG. 3 is a block diagram of a network entity, such as a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the DMRS bundling component 198 of FIG. 1.

At least one of the TX processor 316, the RX processor 370, and the controller/processor 375 may be configured to perform aspects in connection with the activation/duration component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc., that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
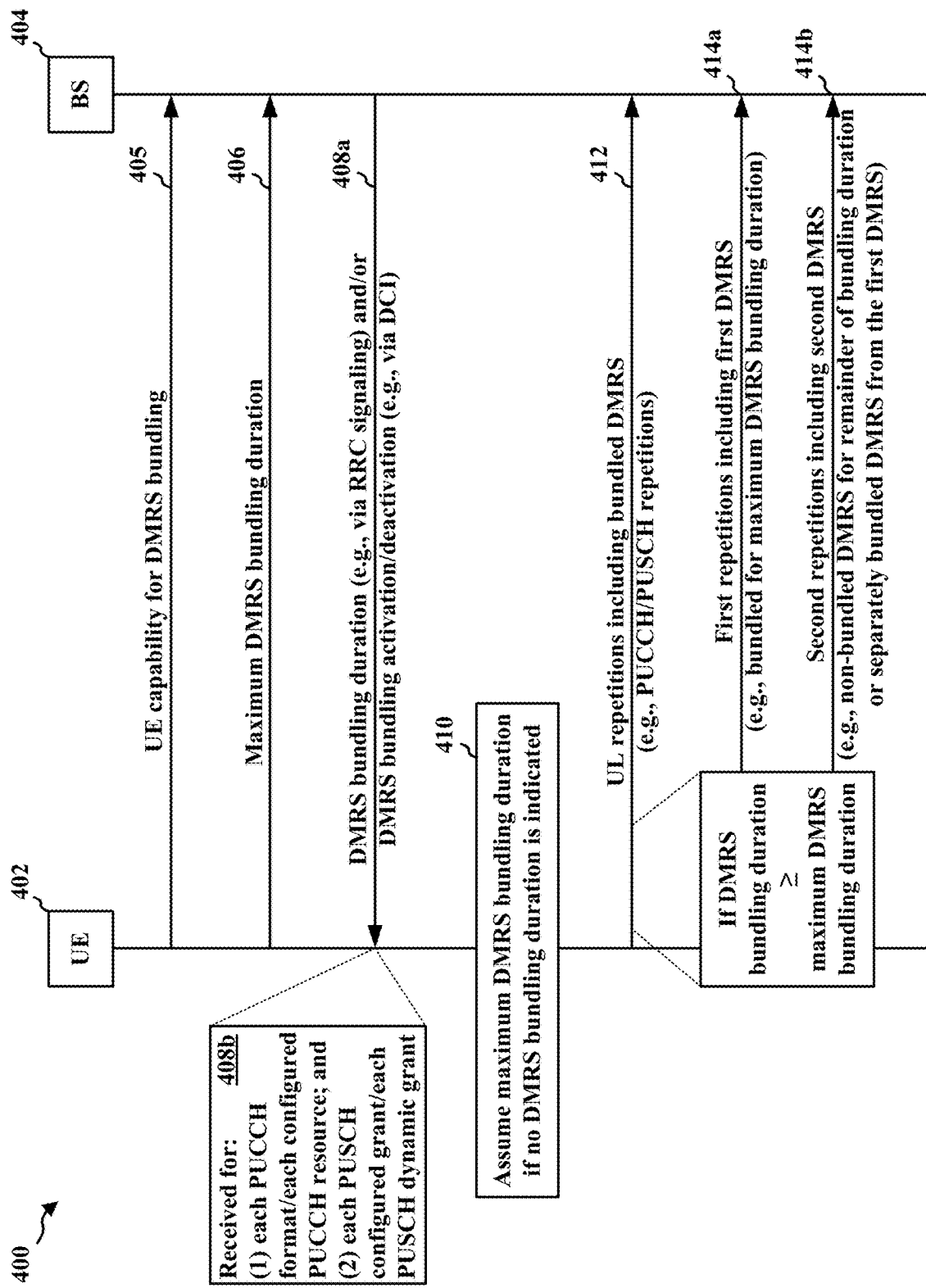
FIG. 4 is a call flow diagram illustrating communications between a UE and a network entity (e.g., base station).

FIG. 4 is a call flow diagram 400 illustrating communications between a UE 402 and a network entity, such as a base station 404. At 405, the UE 402 may transmit a UE capability for DMRS bundling to the base station 404. A message/report of the UE capability may include 1 bit indicating whether the UE 402 is able to perform the DMRS bundling. If the UE 402 is able to perform the DMRS bundling, the UE 402 may determine a maximum DMRS bundling duration for which the UE 402 is capable of maintaining transmit phase coherence and transmit, at 406, a same or separate indication of the determined maximum DMRS bundling duration to the base station 404. The maximum DMRS bundling duration may be based on a function indicative of a relationship between a TTD band and a FDD band. More specifically, the function may be indicative of a TDD slot pattern. The UE 402 may determine the maximum DMRS bundling duration based on physical transmission characteristics including, in some cases, characteristics of associated frequency bands.

Based on the maximum DMRS bundling duration, the base station 404 may transmit, at 408a, an indication of a DMRS bundling duration to be applied by the UE 402 and/or an indication of a DMRS bundling activation/deactivation for the UE 402. The DMRS bundling duration may be indicated to the UE 402, at 408a, via RRC signaling, whereas the DMRS bundling activation/deactivation may be indicated to the UE 402, at 408a, via DCI. At 408b, the DMRS bundling duration and/or the DMRS bundling activation/deactivation may be received, e.g., at 408(1), for each PUCCH format of a set of PUCCH formats, or for each configured PUCCH resource of a set of PUCCH resources. At 408b, the DMRS bundling duration and/or the DMRS bundling activation/deactivation may be similarly received, e.g., at 408(2), for each PUSCH configured grant of a set of PUSCH configured grants, or for each PUSCH dynamic grant. At 410, if no DMRS bundling duration is indicated to the UE 402 from the base station 404, the UE 402 may assume the DMRS bundling duration is equal to the determined maximum DMRS bundling duration.

At 412, the UE 402 may transmit UL repetitions including bundled DMRS to the base station 404 based on the DMRS bundling duration and/or the DMRS bundling activation/deactivation received, at 408a, from the base station 404. The UL repetitions transmitted, at 412, to the base station 404 may be PUCCH repetitions or PUSCH repetitions.

If the DMRS bundling duration (e.g., received at 408a) is greater than or equal to the maximum DMRS bundling duration (e.g., transmitted at 406), the UE 402 may transmit, at 414a, first repetitions including first DMRS to the base station 404. The first DMRS may be bundled DMRS transmitted to the base station 404 for up to the maximum DMRS bundling duration. When the DMRS bundling duration (e.g., received at 408a) exceeds the maximum DMRS bundling duration (e.g., transmitted at 406), the UE 402 may transmit, at 414b, second repetitions including second DMRS to the base station 404 for a remainder of the DMRS bundling duration that exceeds the maximum DMRS bundling duration. For the remainder of the DMRS bundling duration, the second DMRS may be non-bundled DMRS, or the second DMRS may be separately bundled DMRS from the first DMRS. Based on the increased robustness provided by the UL repetitions including the bundled DMRS, channel quality estimations may be improved.

Figure 5:
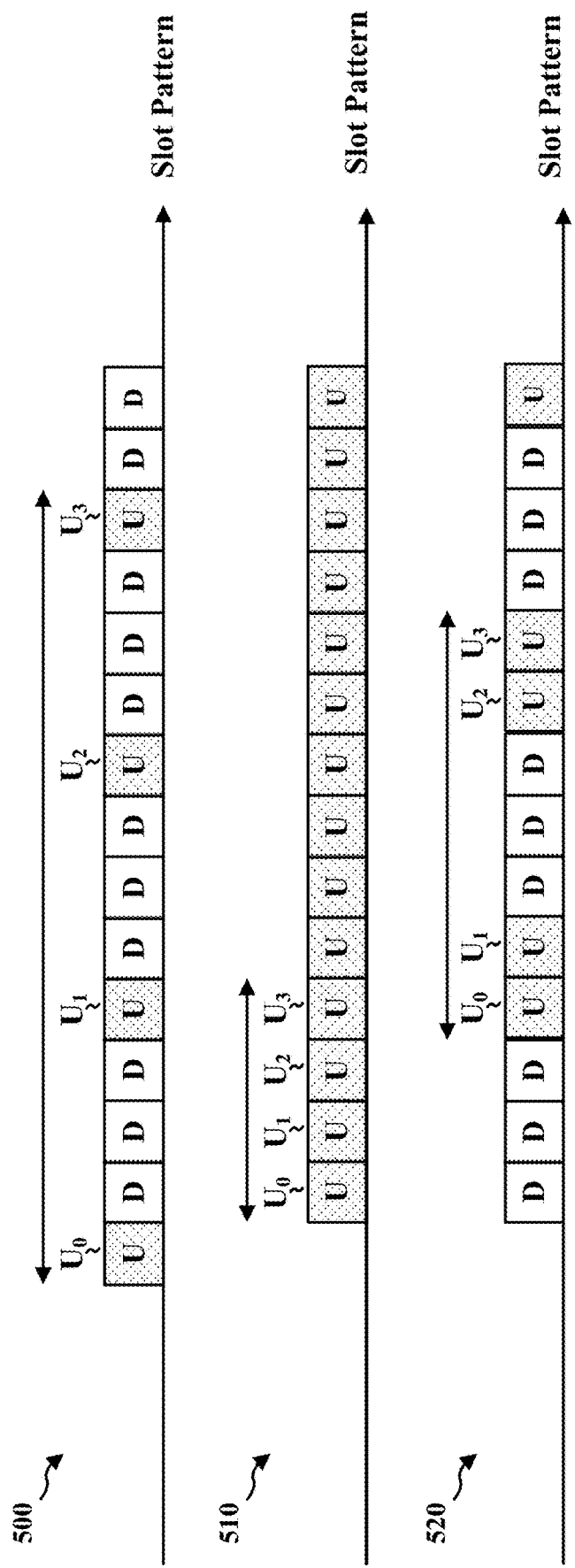
FIG. 5 illustrates slot patterns including UL slots and DL slots.

FIG. 5 illustrates slot patterns 500-520 including UL slots and DL slots. UL channel repetitions (e.g., PUCCH repetitions) may be deferred by a UE in some cases, rather than being dropped. To perform the UL repetitions, a same payload may be transmitted over multiple slots via multiple UL transmissions, such that a receiver (e.g., of a base station) may be able to combine multiple received signals over the multiple slots corresponding to the repetitions. Based on the combined signal, the receiver/base station may determine transmitter/UE information with increased reliability. Instances for which the UE may transmit PUCCH repetitions may be based on a defined pattern, such as the slot patterns 500-520. Since both UL transmissions and DL transmissions may be on a same frequency band in a TDD system, a pattern of UL slots and DL slots may be alternated based on a defined ratio of the UL slots (e.g., indicated by U in the slot patterns 500-520) and the DL slots (e.g., indicated by D in the slot patterns 500 and 520).

In an example slot pattern corresponding to DDDSU associated with a PUCCH configured for two repetitions, the example slot pattern may be twice repeated as DDD-SUDDDSU for transmitting the PUCCH in two U slots of the example slot pattern. In the example slot pattern, three DL slots are followed by one transition slot (e.g., indicated by S), which is further followed by one UL slot. The example slot pattern is at least twice repeating to provide the two U slots, and may be repeated any number of times based on the number of PUCCH repetitions to be transmitted. In configurations, the transition slot may be determined to be a partial DL slot and a partial UL slot. Thus, the transition slot may not be utilized in the example slot pattern DDDSU to transmit the PUCCH repetitions.

A duration of a slot may be 0.5-1 milliseconds, depending on a subcarrier spacing. If the PUCCH is to be transmitted, e.g., 2 times or 4 times, the UE may determine corresponding instances (e.g., UL slots) within the slot patterns 500-520 to perform the transmissions. Since the slot patterns 500-520 may be formed by repeating a smaller sequence of slots, two or more UL slots may be strung together by repeating the smaller sequence. For instance, in the example slot pattern DDDSU the two UL slots that are strung together are separated by 5 slots in the twice repeated example slot pattern DDDSUDDDSU.

The UE may determine and drop the DL slots for the transmission, as the DL slots may not be utilized for the PUCCH repetitions. Thus, a first instance of the PUCCH transmission may be in an initial UL slot (e.g., $U_0$), a first UL slot (e.g., $U_1$), etc., and a next instance/repetition of the PUCCH transmission may be in a next UL slot. In additional configurations, 2, 4, or 8 repetitions may be performed for which a determined slot pattern, such as the slot patterns 500-520, may be further repeated to determine further instances for transmitting the PUCCH. The UE may schedule the PUCCH transmissions based on the determined instances/UL slots for transmitting the PUCCH.

An UL slot utilized for the PUCCH transmission may include a starting symbol for the PUCCH transmission, which may be indicated based on a PUCCH configuration. Further, an entire sequence of the PUCCH transmission may be transmitted within the UL slot. For example, if the PUCCCH transmission corresponds to 10 symbols, then in addition to the starting symbol, 10 contiguous symbols may have to be available for transmitting the PUCCH. Based on such aspects being confirmed by the UE, the slot may be utilized for the PUCCH transmission.

The slot patterns 500-520 may be associated with a timeline corresponding to determinations of the UE. For example, at a first time instance preceding a first UL slot (e.g., $U_1$), the UE may determine that the first UL slot $U_1$ includes available resources for transmitting the entire PUCCH transmission. Thus, at the first time instance (e.g., at a point in time prior to the first UL slot $U_1$), the UE may determine a number of UL slots over which the PUCCH repetitions may be transmitted. In the slot pattern 500, three repetitions may be performed based on the UE determining, after an initial UL slot (e.g., $U_0$) but before the first UL slot $U_1$, the available UL slots for performing the three PUCCH repetitions.

In some cases, an intervening event may occur between the first time instance for which the UE determines to transmit the PUCCCH repetitions and a second time instance for which the UE performs the PUCCH repetitions. For instance, the UE may determine to perform three PUCCH repetition but prior to actually performing, e.g., the third repetition on a third UL slot $U_3$, the UE may receive signaling that indicates the third UL slot $U_3$ is no longer available for the PUCCH transmission (e.g., the third UL slot $U_3$ may have been converted to a DL slot). Such changes in the availability of the UL slots may be associated with slot format indication (SFI) procedures. Accordingly, even though the UE may have determined to transmit a PUCCH repetition on the third UL slot $U_3$, the intervening event may have changed the UL grant such that the UE may be unable to perform the PUCCH repetition. Cancellations or changes to the slot format may not be determinable by the UE. A set of UL slots (e.g., $U_1$-$U_3$) determined for the repetitions may instead be assumed by the UE to continue to remain available for the repetitions from a time that the set of UL slots are initially determined for the PUCCH transmissions. That is, an availability of the set of UL slots may not be re-verified by the UE to determine whether any of the UL slots in the set of UL slots have been cancelled or changed.

A timeframe for transmitting the UL repetitions may depend on a configuration of the slot pattern (e.g., a number and/or a ratio of UL slots, DL slots, and flexible slots included in the slot pattern). Thus, a duration between a start of a first transmission and an end of a last transmission may have variability based on the configuration of the slot pattern. For example, in the slot pattern 500, three DL slots may be included between each of four UL slots (e.g., $U_0$-$U_3$) to be utilized for the PUCCH repetitions. Thus, a total timeframe for transmitting the four PUCCH repetitions based on the slot pattern 500 is 13 slots. In the slot pattern 510, all of the slots are UL slots, such that the total timeframe for transmitting the four PUCCH repetitions (e.g., via the UL slots $U_0$-$U_3$) is 4 slots. The slot pattern 510 may be utilized for FDD systems where the UL slots and the DL slots may be separated into respective subbands. In the slot pattern 520, three DL slots are followed by two UL slots. As such, the total timeframe for transmitting the four PUCCH repetitions based on the slot pattern 520 (e.g., via the UL slots $U_0$-$U_3$) is 7 slots. Variability amongst slot patterns, such as the slot patterns 500-520, may decrease a reliability of the UE for predicting in advance the timeframe for transmitting the PUCCH repetitions.

Figure 6:
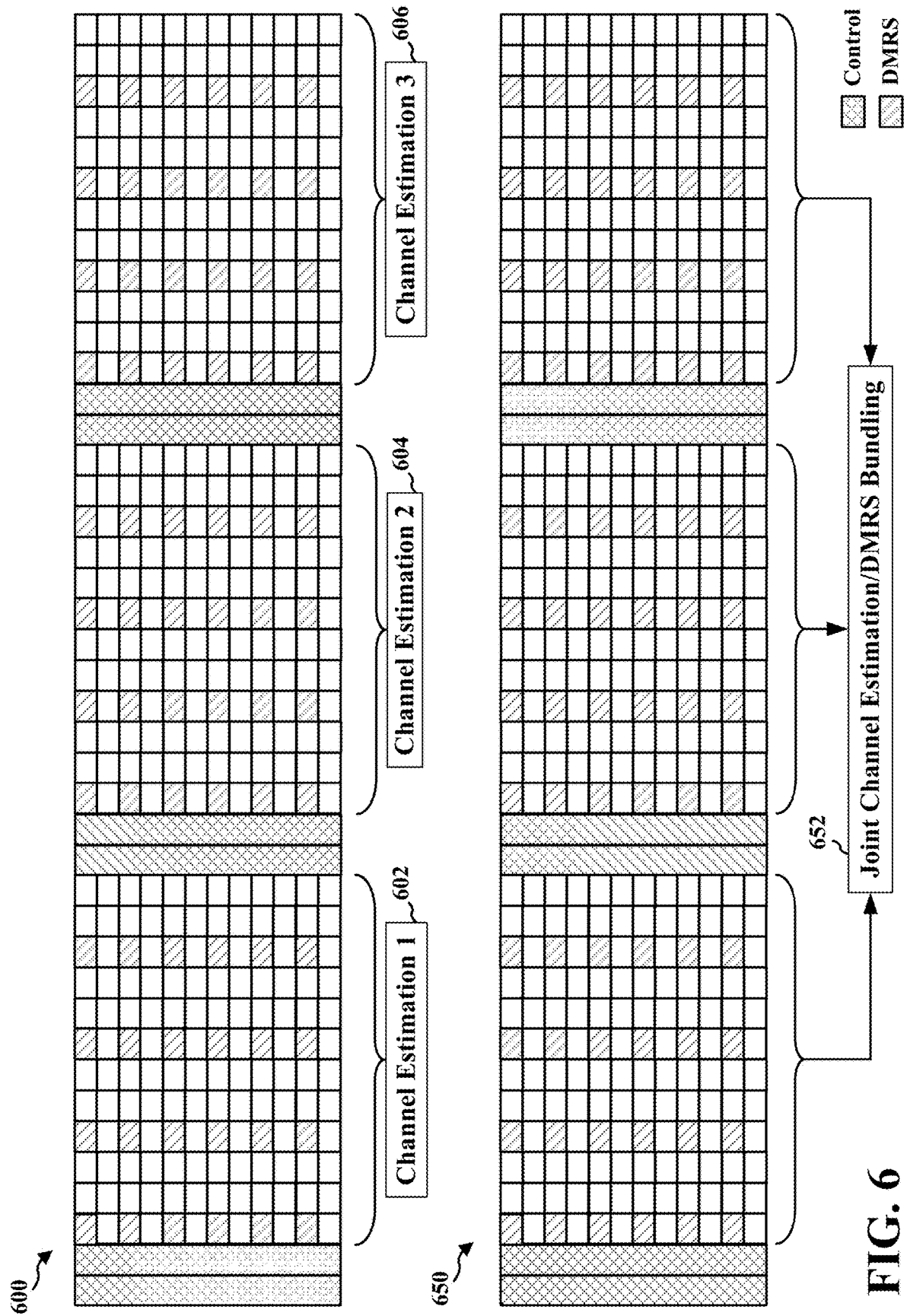
FIG. 6 illustrates diagrams for channel estimation techniques.

FIG. 6 illustrates diagrams 600-650 for channel estimation techniques (e.g., where DMRS may be included in a plurality of slots). When DMRS is bundled to enable joint channel estimation 652 over a plurality of repetitions, determining the timeframe for transmitting the repetitions may allow the UE to determine whether the UE is able to maintain phase coherence for a duration of the timeframe. The base station may request the UE to transmit the repetitions in a coherent manner that is configured, e.g., to allow the base station to perform the joint channel estimation 652 over the plurality of repetitions. To enable the joint channel estimation 652 by the base station, the UE may have to maintain phase coherence over the respective repetitions. Maintaining phase coherence may include leaving the entire transmit chain in an unmodified state at least until all of the repetitions are transmitted. That is, once a first repetition is transmitted, the UE may maintain the state of the transmit chain until the $2^{nd}$ through Nth (e.g., last) transmissions have been transmitted. Despite some slot patterns (e.g., the slot patterns 500 and 520) including DL slots between the UL slots that may cause the UE to switch between an UL mode and a DL mode, the UE may still have to ensure that the state of the transmit chain remains unaltered and that phase coherence is maintained.

Given that the timeframe for transmitting the repetitions varies amongst slot patterns (e.g., the slot patterns 500-520), the UE may be unable to determine in some cases the duration for which phase coherence has to be maintained for completing the repetitions. Further, the UE may have to suspend execution of certain procedures for allowing the state of the transmit chain to remain unaltered during the timeframe of the repetitions. To fulfill a request from the base station that the UE maintains phase coherence for transmission of the repetitions, PUCCH DMRS bundling (e.g., for joint channel estimation 652) may be performed over the PUCCH repetitions.

In the diagram 600, the base station may process the DMRS on a slot-by-slot basis, e.g., without bundling the DMRS across multiple slots. That is, the base station may separately perform a first channel estimation 602, a second channel 604, a third channel estimation 606, etc. In the diagram 650, the base station may perform DMRS bundling of the UL transmissions across the multiple slots in a joint manner for a joint channel estimation 652. An estimated channel quality based on joint channel estimation 652 may provide increased robustness and improved performance. Accordingly, a receiver/base station may jointly process the DMRS in multiple PUCCH/PUSCH transmissions, and a transmitter/UE may maintain phase coherence over the multiple PUCCH/PUSCH transmissions.

The base station may transmit a 1-bit signal to the UE indicative of whether DMRS bundling is to be performed. The base station may also provide bundling information to the UE based on a bundling activation field and/or a bundling duration field. The bundling activation field may correspond to 1 bit per PUCCH resource/PUCCH format indicating an activation/deactivation of DMRS bundling. The bundling duration field may correspond to N bits indicating a determined duration of the bundling duration. In some configurations, the bundling duration field may be included in the bundling information. Based on the UE receiving a request to bundle the DMRS, the DMRS bundling duration associated with the timeframe for maintaining phase coherence may be indicated to the UE in absolute time (e.g., based on a number of slots). That is, the base station may provide an explicit indication of the timeframe for which the base station intends to jointly process incoming DMRS. A beginning of the DMRS bundling duration may correspond to a beginning of a first UL transmission associated with the repetitions (e.g., PUCCH/PUSCH repetitions).

In some configurations, the bundling activation field may be omitted and the UE may rely on the bundling duration field, where the UE may infer the bundling activation based on the bundling duration. For example, if the bundling duration is 1 slot, the UE may infer that no bundling is to be performed. Thus, the base station may not explicitly indicate a 1-bit activation/deactivation. The base station may also signal the bundling activation dynamically. The bundling duration may be RRC configured. The bundling duration may be indicated based on a number of slots, absolute time, a number of repetitions, etc., over which the UE is to perform the bundling. For example, the UE may bundle pairs of repetitions, such as in a four-repetition transmission.

Activation/deactivation signaling for DMRS bundling may be based on reference values received/determined by the base station. The reference values may be indicative of a UE capability associated with the DMRS bundling duration. For example, a maximum bundling duration may be indicated to the base station in absolute time to indicate a maximum duration for which the UE is able to maintain phase coherence for the DMRS bundling/joint channel estimation 652. That is, the maximum bundling duration may indicate to the base station an amount of time for which the UE is able to maintain the transmit chain in the unaltered state, so that subsequent transmissions may be phase coherent with previous transmissions. The amount of time for which the UE is able to maintain phase coherence may be UE-dependent. The maximum bundling duration may also indicate that once the UE exceeds the indicated amount of time for the maximum bundling duration, the UE may schedule other procedures, such as RF calibrations, timing adjustments, etc., as such procedures may not be able to be further postponed beyond the maximum bundling duration.

In other configurations, the base station may drop bundling duration signaling for the UE based on an assumption that the bundling duration is equal to the maximum bundling duration. For example, if the bundling duration is assumed to be a predetermined/default value by the UE and the base station, the bundling duration field may be excluded from the signaling from the base station to the UE. Such techniques may reduce signaling overhead to a single bit, as the signaling may include solely the bundling activation/deactivation bit.

If the bundling duration is explicitly indicated (e.g., via a number of slots or absolute time), the base station may ensure that the bundling duration is less than or equal to the maximum bundling duration indicated via the UE capability received from the UE. Since the bundling duration and the maximum bundling duration are distinct parameters, the base station may confirm that the bundling duration is supported by the maximum bundling duration. If the bundling duration is indicated by the base station based on a number of repetitions, a total time for transmitting the number of repetitions may in some cases exceed the maximum bundling duration, since the timeframe for transmitting the repetitions may not be determinable due to variability amongst different slot patterns. Thus, the UE may provide an indication to the base station when the total time for transmitting the number of repetitions exceeds the UE capability associated with the maximum bundling duration. The UE may terminate the bundling after the maximum bundling duration is exceeded and initiate a new bundle, or the UE may terminate the bundling after the maximum bundling duration is exceeded and transmit a remaining number of repetitions from the number of repetitions without performing the bundling. For example, if the number of repetitions is 8 repetitions and the UE transmits 5 repetitions before the maximum bundling duration is exceeded, the remaining 3 repetitions may be transmitted based on non-bundled techniques.

The bundling techniques described herein may also be applicable to other UL channels, such as PUSCH. For example, techniques for transmitting PUSCH repetitions may be similar to techniques for transmitting the PUCCH repetitions. Alternatively, the techniques for transmitting the PUSCH repetitions may be based on different protocols than the protocols utilized for transmitting the PUCCH repetitions.

Figure 7:
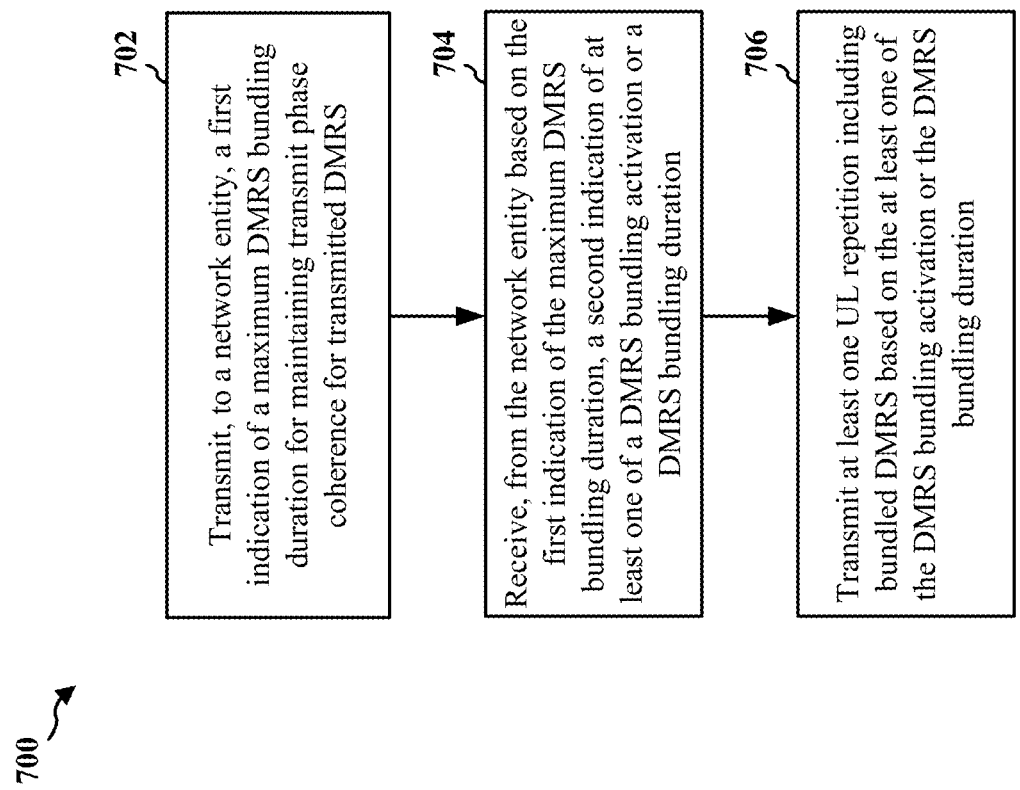
FIG. 7 is a flowchart of a method of wireless communication at a UE.

FIG. 7 is a flowchart 700 of a method of wireless communication. The method may be performed by a UE (e.g., the UE 104/402; the apparatus 1102; etc.), which may include the memory 360 and which may be the entire UE 104/402 or a component of the UE 104/402, such as the TX processor 368, the RX processor 356, and/or the controller/processor 359.

At 702, the UE may transmit, to a network entity, a first indication of a maximum DMRS bundling duration for maintaining transmit phase coherence for transmitted DMRS. For example, referring to FIG. 4, the UE 402 may transmit, at 406, an indication of the maximum DMRS bundling duration of the UE 402. The maximum DMRS bundling duration transmitted, at 406, may be based on at least one of a FFD band, a TDD band, or a TDD slot pattern. The transmission, at 702, may be performed by the DMRS bundler component 1140 of the apparatus 1102 in FIG. 11.

At 704, the UE may receive, from the network entity based on the first indication of the maximum DMRS bundling duration, a second indication of at least one of a DMRS bundling activation or a DMRS bundling duration. For example, referring to FIG. 4, the UE 402 may receive, at 408a, an indication of a DMRS bundling duration and/or a DMRS bundling activation from the base station 404, based on the indication of the maximum DMRS bundling duration transmitted, at 406, to the base station 404. The reception, at 704, may be performed by the DMRS bundler component 1140 of the apparatus 1102 in FIG. 11.

At 706, the UE may transmit at least one UL repetition including bundled DMRS based on the at least one of the DMRS bundling activation or the DMRS bundling duration. For example, referring to FIG. 4, the UE 402 may transmit, at 412, UL repetitions including bundled DMRS to the base station 404 based on DMRS bundling duration and/or DMRS bundling activation received, at 408a, from the base station 404. The transmission, at 706, may be performed by the UL repetitions component 1144 of the apparatus 1102 in FIG. 11.

Figure 8:
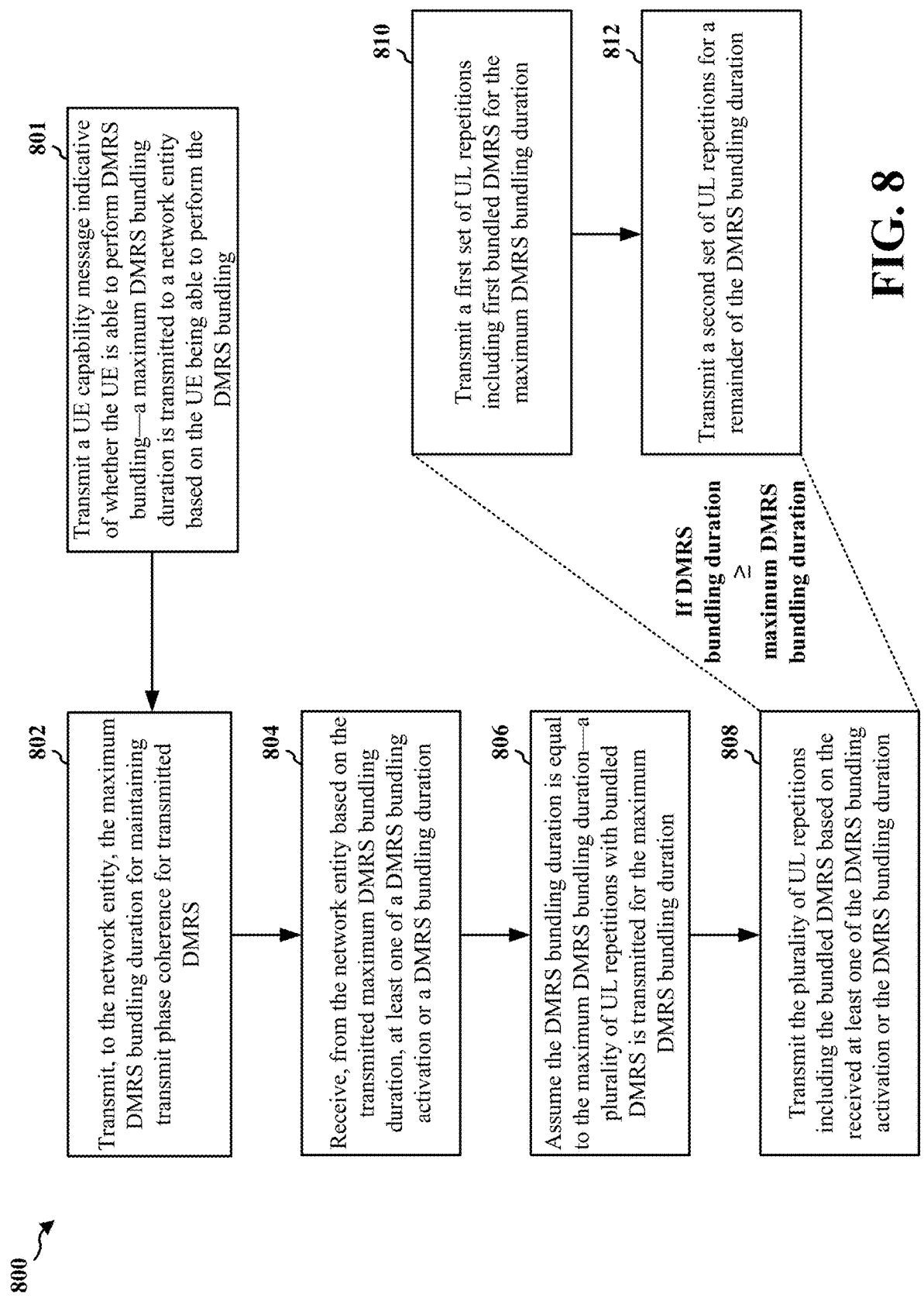
FIG. 8 is a flowchart of a method of wireless communication at a UE.

FIG. 8 is a flowchart 800 of a method of wireless communication. The method may be performed by a UE (e.g., the UE 104/402; the apparatus 802; etc.), which may include the memory 360 and which may be the entire UE 104/402 or a component of the UE 104/402, such as the TX processor 368, the RX processor 356, and/or the controller/processor 359.

At 801, the UE may transmit a UE capability message indicative of whether the UE is able to perform DMRS bundling—a maximum DMRS bundling duration is transmitted to a network entity based on the UE being able to perform the DMRS bundling. For example, referring to FIG. 4, the UE 402 may transmit, at 405, the UE capability for DMRS bundling to the base station 404, such that the maximum DMRS bundling duration may be transmitted, at 406, to the base station 404 when the UE capability indicates that the UE 402 is able to perform the DMRS bundling. The transmission, at 801, may be performed by the DMRS bundler component 1140 of the apparatus 1102 in FIG. 11.

At 802, the UE may transmit, to the network entity, the maximum DMRS bundling duration for maintaining transmit phase coherence for transmitted DMRS. For example, referring to FIG. 4, the UE 402 may transmit, at 406, an indication of the maximum DMRS bundling duration of the UE 402. The maximum DMRS bundling duration transmitted, at 406, may be based on at least one of a FFD band, a TDD band, or a TDD slot pattern. The transmission, at 802, may be performed by the DMRS bundler component 1140 of the apparatus 1102 in FIG. 11.

At 804, the UE may receive, from the network entity based on the transmitted maximum DMRS bundling duration, at least one of a DMRS bundling activation or a DMRS bundling duration. For example, referring to FIG. 4, the UE 402 may receive, at 408a, an indication of a DMRS bundling duration and/or a DMRS bundling activation from the base station 404, based on the indication of the maximum DMRS bundling duration transmitted, at 406, to the base station 404. In a first aspect, the at least one of the DMRS bundling activation or the DMRS bundling duration received, at 408a, may include the DMRS bundling activation. The DMRS bundling activation may be received, at 408a, in DCI scheduling a plurality of UL repetitions (e.g., transmitted at 412). In a second aspect, the at least one of the DMRS bundling activation or the DMRS bundling duration received, at 408a, may include the DMRS bundling duration. The DMRS bundling duration may be received, at 408a, through RRC signaling. A beginning of the indicated bundling duration received, at 408a, may correspond to a beginning of a first UL transmission for the plurality of UL repetitions (e.g., transmitted at 412). The at least one of the DMRS bundling activation or the DMRS bundling duration may be received, at 408a based on 408b(1), for at least one of each PUCCH format (e.g., of a set of PUCCH formats) or each configured PUCCH resource (e.g., of a set of PUCCH resources). The at least one of the DMRS bundling activation or the DMRS bundling duration may be received, at 408a based on 408b(2), for at least one of each PUSCH configured grant (e.g., of a set of PUSCH configured grants) or each PUSCH dynamic grant. The reception, at 804, may be performed by the DMRS bundler component 1140 of the apparatus 1102 in FIG. 11.

At 806, the UE may assume the DMRS bundling duration is equal to the maximum DMRS bundling duration—a plurality of UL repetitions with bundled DMRS is transmitted for the maximum DMRS bundling duration. For example, referring to FIG. 4, the UE 402 may assume, at 410, the maximum DMRS bundling duration for the DMRS bundling duration, if no DMRS bundling duration is indicated, at 408a, by the base station 404. UL repetitions including bundled DMRS may be transmitted, at 412, to the base station 404 based on the assumed maximum DMRS bundling duration. The assumption, at 806, may be performed by the inference component 1142 of the apparatus 1102 in FIG. 11.

At 808, the UE may transmit the plurality of UL repetitions including the bundled DMRS based on the received at least one of the DMRS bundling activation or the DMRS bundling duration. For example, referring to FIG. 4, the UE 402 may transmit, at 412, UL repetitions including bundled DMRS to the base station 404 based on DMRS bundling duration and/or DMRS bundling activation received, at 408a, from the base station 404. The at least one of the DMRS bundling activation or the DMRS bundling duration received, at 408a, may include the DMRS bundling activation, such that the plurality of UL repetitions with the bundled DMRS may be transmitted, at 412, upon receiving, at 408a, the DMRS bundling activation. The at least one of the DMRS bundling activation or the DMRS bundling duration received, at 408a, may include the DMRS bundling duration, such that the plurality of UL repetitions with the bundled DMRS may be transmitted, at 412, based at least on the DMRS bundling duration. The plurality of UL repetitions with the bundled DMRS may be transmitted, at 412, for the DMRS bundling duration when the DMRS bundling duration is greater than or equal to two slots and is less than or equal to the maximum DMRS bundling duration. In a first example, the UL repetitions transmitted, at 412, may include PUCCH repetitions. In a second example, the UL repetitions transmitted, at 412, may include PUSCH repetitions. The transmission, at 808, may be performed by the UL repetitions component 1144 of the apparatus 1102 in FIG. 11.

At 810, if the DMRS bundling duration is greater than or equal to the maximum DMRS bundling duration, the UE may transmit a first set of UL repetitions including first bundled DMRS for the maximum DMRS bundling duration. For example, referring to FIG. 4, if the DMRS bundling duration is ≥ the maximum DMRS bundling duration, the UE 402 may transmit, at 414a, first repetitions including first DMRS, which may be bundled for the maximum DMRS bundling duration. The transmission, at 810, may be performed by the UL repetitions component 1144 of the apparatus 1102 in FIG. 11.

At 812, if the DMRS bundling duration is greater than or equal to the maximum DMRS bundling duration, the UE may transmit a second set of UL repetitions for a remainder of the DMRS bundling duration. For example, referring to FIG. 4, if the DMRS bundling duration is ≥ the maximum DMRS bundling duration, the UE 402 may transmit, at 414b, second repetitions including second DMRS, which may be for non-bundled DMRS associated with a remainder of the DMRS bundling duration that exceeds the maximum DMRS bundling duration. In cases where the DMRS bundling duration is equal to the maximum DMRS bundling duration, the remainder of the DMRS bundling duration may be 0. In a first configuration, the second set of UL repetitions may include second bundled DMRS that may be separately bundled from the first bundled DMRS. In a second configuration, the second set of UL repetitions may include non-bundled DMRS. The transmission, at 812, may be performed by the UL repetitions component 1144 of the apparatus 1102 in FIG. 11.

Figure 9:
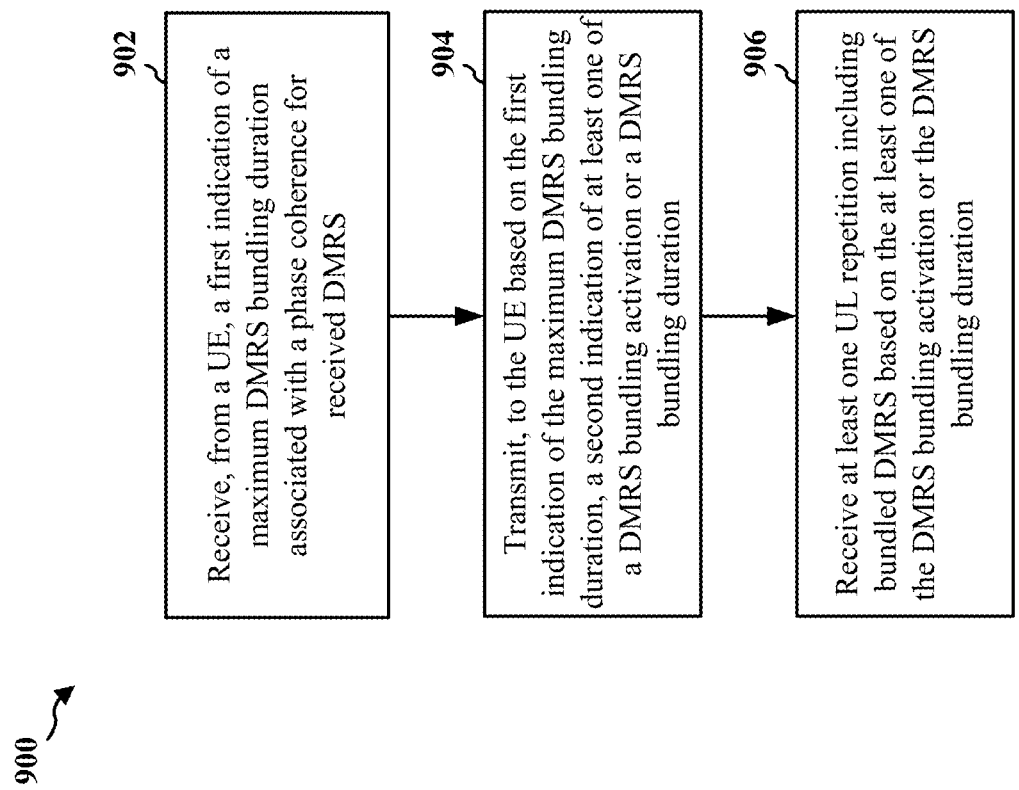
FIG. 9 is a flowchart of a method of wireless communication at a network entity.

FIG. 9 is a flowchart 900 of a method of wireless communication. The method may be performed by a network entity (e.g., the base station 102/404; the apparatus 1202; etc.), which may include the memory 376 and which may be the entire base station 102/404 or a component of the base station 102/404, such as the TX processor 316, the RX processor 370, and/or the controller/processor 375.

At 902, the network entity may receive, from a UE, a first indication of a maximum DMRS bundling duration associated with a phase coherence for received DMRS. For example, referring to FIG. 4, the base station 404 may receive, at 406, a maximum DMRS bundling duration from the UE 402. The reception, at 902, may be performed by the DMRS bundler component 1242 of the apparatus 1202 in FIG. 12.

At 904, the network entity may transmit, to the UE based on the first indication of the maximum DMRS bundling duration, a second indication of at least one of a DMRS bundling activation or a DMRS bundling duration. For example, referring to FIG. 4, the base station 404 may transmit, at 408a, a DMRS bundling duration to the UE 402 via RRC signaling and/or a DMRS bundling activation/deactivation to the UE 402 via DCI. The transmission, at 904, may be performed by the DMRS bundler component 1242 of the apparatus 1202 in FIG. 12.

At 906, the network entity may receive at least one UL repetition including bundled DMRS based on the at least one of the DMRS bundling activation or the DMRS bundling duration. For example, referring to FIG. 4, the base station 404 may receive, at 412, UL repetitions from the UE 402 including bundled DMRS. The reception, at 906, may be performed by the UL repetitions component 1244 of the apparatus 1202 in FIG. 12.

Figure 10:
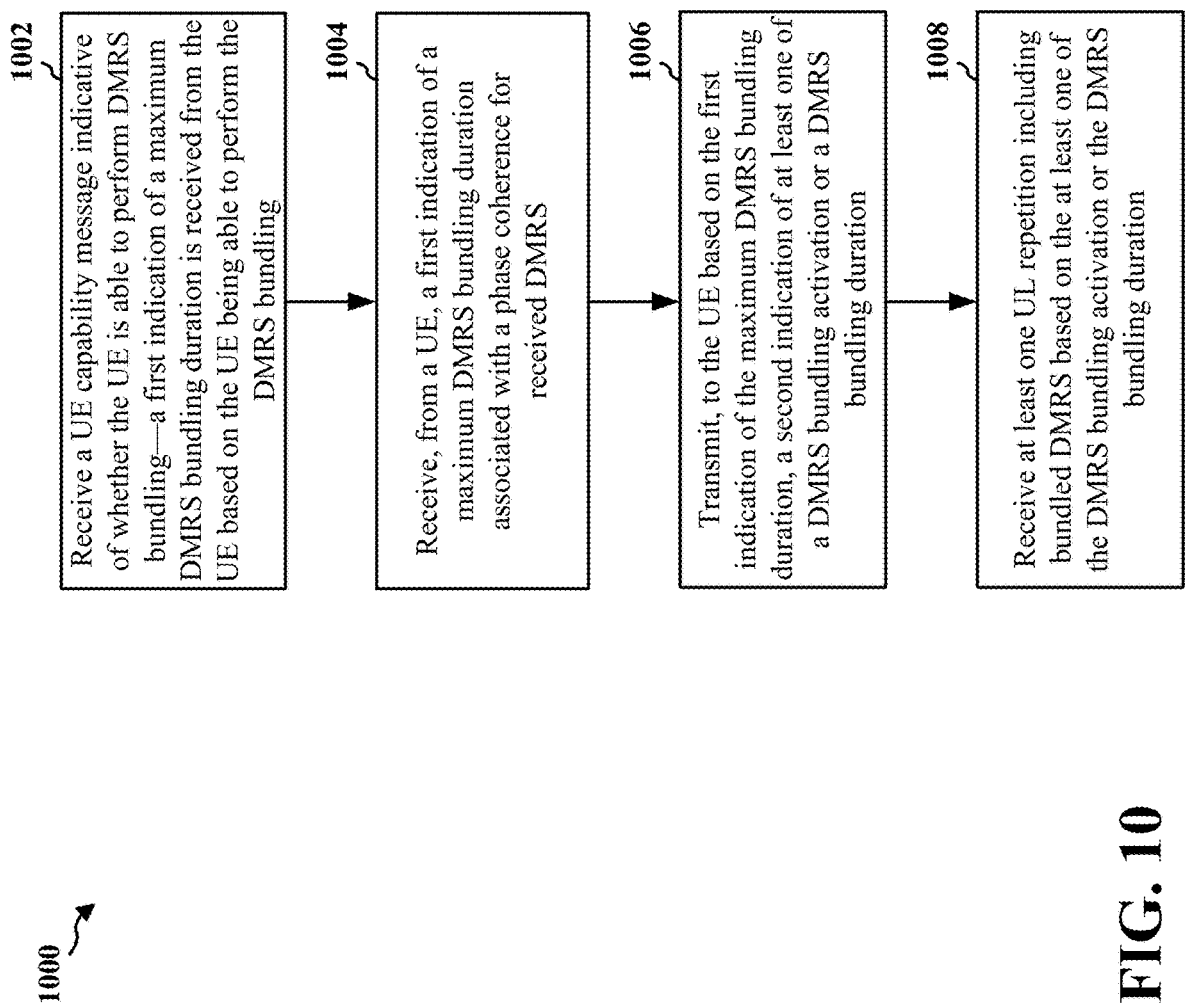
FIG. 10 is a flowchart of a method of wireless communication at a network entity.

FIG. 10 is a flowchart 1000 of a method of wireless communication. The method may be performed by a network entity (e.g., the base station 102/404; the apparatus 1202; etc.), which may include the memory 376 and which may be the entire base station 102/404 or a component of the base station 102/404, such as the TX processor 316, the RX processor 370, and/or the controller/processor 375.

At 1002, the network entity may receive a UE capability message indicative of whether the UE is able to perform DMRS bundling—a first indication of a maximum DMRS bundling duration is received from the UE based on the UE being able to perform the DMRS bundling. For example, referring to FIG. 4, the base station 404 may receive, at 405, a UE capability for DMRS bundling from the UE 402. The base station 404 may receive, at 406, a maximum DMRS bundling duration from the UE 402 based on the UE capability received, at 405, from the UE 402. The reception, at 1002, may be performed by the UE capability component 1240 of the apparatus 1202 in FIG. 12.

At 1004, the network entity may receive, from a UE, a first indication of a maximum DMRS bundling duration associated with a phase coherence for received DMRS. For example, referring to FIG. 4, the base station 404 may receive, at 406, a maximum DMRS bundling duration from the UE 402. The reception, at 1004, may be performed by the DMRS bundler component 1242 of the apparatus 1202 in FIG. 12.

At 1006, the network entity may transmit, to the UE based on the first indication of the maximum DMRS bundling duration, a second indication of at least one of a DMRS bundling activation or a DMRS bundling duration. For example, referring to FIG. 4, the base station 404 may transmit, at 408a, a DMRS bundling duration to the UE 402 via RRC signaling and/or a DMRS bundling activation/deactivation to the UE 402 via DCI. The transmission, at 1006, may be performed by the DMRS bundler component 1242 of the apparatus 1202 in FIG. 12.

At 1008, the network entity may receive at least one UL repetition including bundled DMRS based on the at least one of the DMRS bundling activation or the DMRS bundling duration. For example, referring to FIG. 4, the base station 404 may receive, at 412, UL repetitions from the UE 402 including bundled DMRS. The reception, at 1008, may be performed by the UL repetitions component 1244 of the apparatus 1202 in FIG. 12.

Figure 11:
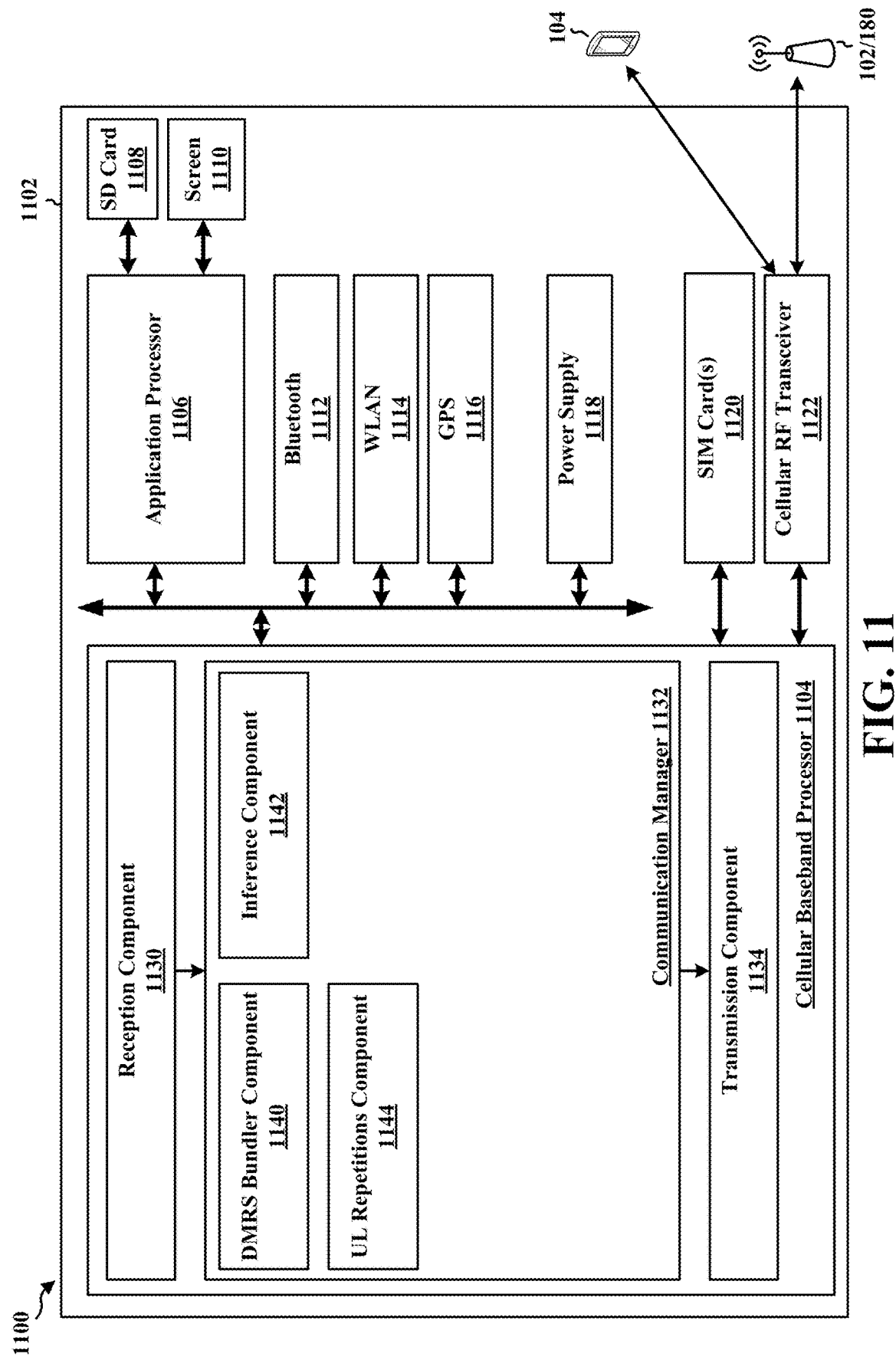
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/ memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a DMRS bundler component 1140 that is configured, e.g., as described in connection with 702, 704, 801, 802, and 804, to transmit a UE capability message indicative of whether the UE is able to perform DMRS bundling—a maximum DMRS bundling duration is transmitted to a network entity based on the UE being able to perform the DMRS bundling; to transmit, to a network entity, a maximum DMRS bundling duration for maintaining transmit phase coherence for transmitted DMRS; and to receive, from the network entity based on the transmitted maximum DMRS bundling duration, at least one of a DMRS bundling activation or a DMRS bundling duration. The communication manager 1132 further includes an inference component 1142 that receives input in the form of DMRS bundling information from the DMRS bundler component 1140 and is configured, e.g., as described in connection with 806, to infer/assume the DMRS bundling duration is equal to the maximum DMRS bundling duration—a plurality of UL repetitions with bundled DMRS is transmitted for the maximum DMRS bundling duration. The communication manager 1132 further includes an UL repetitions component 1144 that receives input in the form of DMRS bundling information from the inference component 1142 and/or the DMRS bundler component 1140 and is configured, e.g., as described in connection with 706, 808, 810, and 812, to transmit the plurality of UL repetitions including the bundled DMRS based on the received at least one of the DMRS bundling activation or the DMRS bundling duration; to transmit a first set of UL repetitions including first bundled DMRS for the maximum DMRS bundling duration; and to transmit a second set of UL repetitions for a remainder of the DMRS bundling duration.

The apparatus may include additional components that perform each of the blocks of the algorithm in the aforementioned flowcharts of FIGS. 7-8. As such, each block in the aforementioned flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for transmitting, to a network entity, a first indication of a maximum DMRS bundling duration for maintaining transmit phase coherence for transmitted DMRS; means for receiving, from the network entity based on the first indication of the maximum DMRS bundling duration, a second indication of at least one of a DMRS bundling activation or a DMRS bundling duration; and means for transmitting at least one UL repetition including bundled DMRS based on the at least one of the DMRS bundling activation or the DMRS bundling duration. The apparatus 1102 further includes means for assuming the DMRS bundling duration is equal to the maximum DMRS bundling duration, where the plurality of UL repetitions with the bundled DMRS is transmitted for the maximum DMRS bundling duration. When the DMRS bundling duration is greater than or equal to the maximum DMRS bundling duration, the means for transmitting the at least one UL repetition is further configured to: transmit a first set of UL repetitions including first bundled DMRS for the maximum DMRS bundling duration; and transmit a second set of UL repetitions for a remainder of the DMRS bundling duration. The apparatus 1102 further includes means for transmitting a UE capability message indicative of whether the UE is able to perform DMRS bundling, the first indication of the maximum DMRS bundling duration being transmitted to the network entity based on the UE being able to perform the DMRS bundling.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
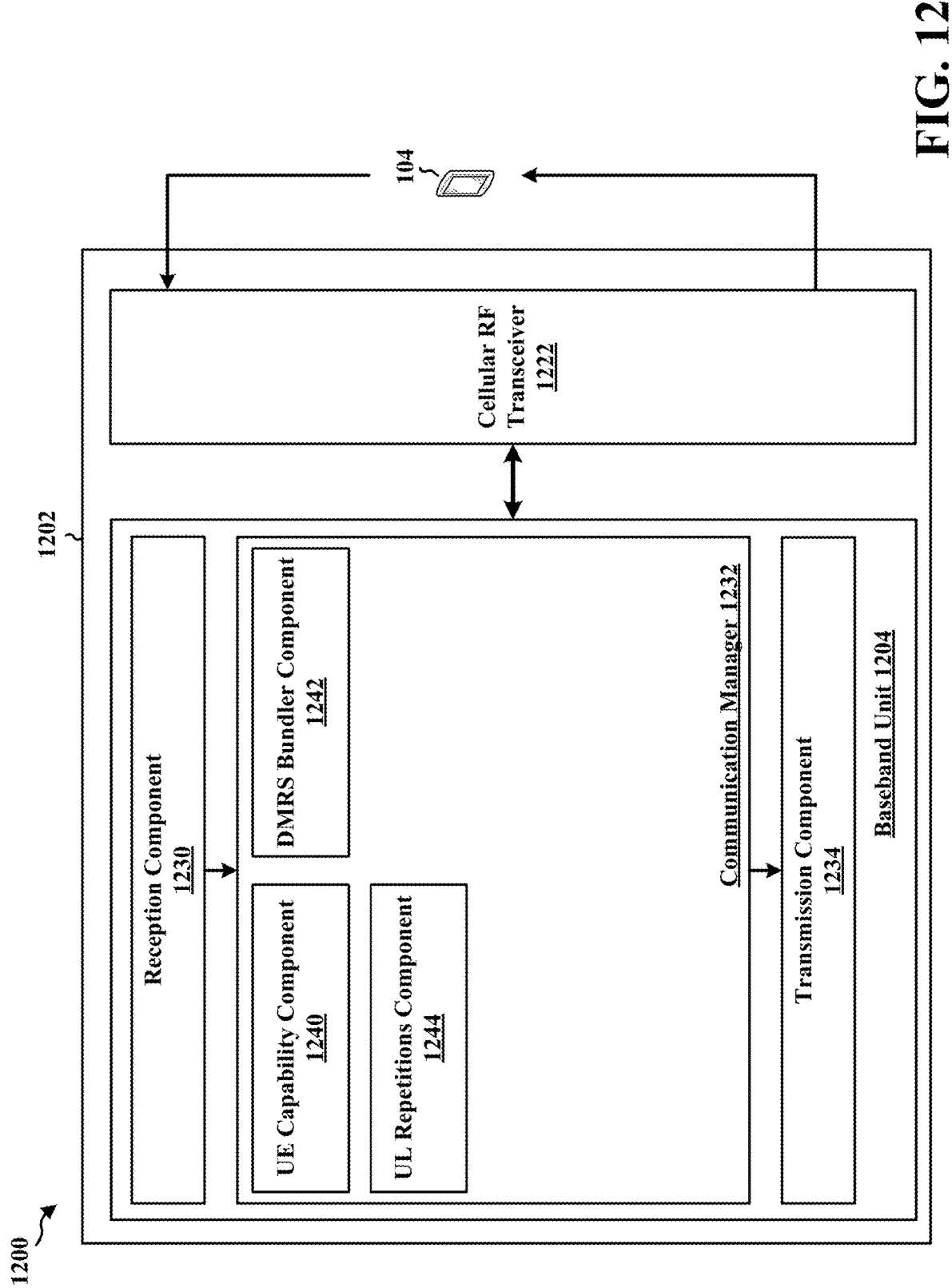
FIG. 12 is a diagram illustrating an example of a hardware implementation for an example apparatus.

FIG. 12 is a diagram 1200 illustrating an example of a hardware implementation for an apparatus 1202. The apparatus 1202 may be a network entity, such as a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a UE capability component 1240 that is configured, e.g., as described in connection with 1002, to receive a UE capability message indicative of whether the UE is able to perform DMRS bundling—a first indication of a maximum DMRS bundling duration is received from the UE based on the UE being able to perform the DMRS bundling. The communication manager 1232 further includes a DMRS bundler component 1242 that is configured, e.g., as described in connection with 902, 904, 1004, and 1006, to receive, from a UE, a first indication of a maximum DMRS bundling duration associated with a phase coherence for received DMRS; and to transmit, to the UE based on the first indication of the maximum DMRS bundling duration, a second indication of at least one of a DMRS bundling activation or a DMRS bundling duration. The communication manager 1232 further includes an UL repetitions component 1244 that is configured, e.g., as described in connection with 906 and 1008, to receive at least one UL repetition including bundled DMRS based on the at least one of the DMRS bundling activation or the DMRS bundling duration.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a UE, a first indication of a maximum DMRS bundling duration associated with a phase coherence for received DMRS; means for transmitting, to the UE based on the first indication of the maximum DMRS bundling duration, a second indication of at least one of a DMRS bundling activation or a DMRS bundling duration; and means for receiving at least one UL repetition including bundled DMRS based on the at least one of the DMRS bundling activation or the DMRS bundling duration. The apparatus 1202 further includes means for receiving a UE capability message indicative of whether the UE is able to perform DMRS bundling, the first indication of the maximum DMRS bundling duration being received from the UE based on the UE being able to perform the DMRS bundling.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including: transmitting, to a network entity, a first indication of a maximum DMRS bundling duration for maintaining transmit phase coherence for transmitted DMRS; receiving, from the network entity based on the first indication of the maximum DMRS bundling duration, a second indication of at least one of a DMRS bundling activation or a DMRS bundling duration; and transmitting at least one UL repetition including bundled DMRS based on the at least one of the DMRS bundling activation or the DMRS bundling duration.

Aspect 2 may be combined with aspect 1 and includes that the second indication of the at least one of the DMRS bundling activation or the DMRS bundling duration is indicative of the DMRS bundling activation, and the at least one UL repetition including the bundled DMRS is transmitted upon receiving the second indication.

Aspect 3 may be combined with any of aspects 1-2 and includes that the DMRS bundling duration is equal to the maximum DMRS bundling duration, where the at least one UL repetition including the bundled DMRS is transmitted for the maximum DMRS bundling duration.

Aspect 4 may be combined with any of aspects 1-2 and includes that the second indication of the at least one of the DMRS bundling activation or the DMRS bundling duration is indicative of the DMRS bundling duration, and the at least one UL repetition including the bundled DMRS is transmitted based at least on the DMRS bundling duration.

Aspect 5 may be combined with any of aspects 1-2 or 4 and includes that the at least one UL repetition including the bundled DMRS is transmitted for the DMRS bundling duration when the DMRS bundling duration is greater than or equal to two slots and is less than or equal to the maximum DMRS bundling duration.

Aspect 6 may be combined with any of aspects 1-2 or 4-5 and includes that when the DMRS bundling duration is greater than or equal to the maximum DMRS bundling duration, the transmitting the at least one UL repetition further includes: transmitting a first set of UL repetitions including first bundled DMRS for the maximum DMRS bundling duration; and transmitting a second set of UL repetitions for a remainder of the DMRS bundling duration.

Aspect 7 may be combined with any of aspects 1-2 or 4-6 and includes that the second set of UL repetitions includes second bundled DMRS, separately bundled from the first bundled DMRS.

Aspect 8 may be combined with any of aspects 1-2 or 4-7 and includes that the second set of UL repetitions includes non-bundled DMRS.

Aspect 9 may be combined with any of aspects 1-8 and includes that the second indication of the at least one of the DMRS bundling activation or the DMRS bundling duration is indicative of the DMRS bundling activation, and where the second indication is received in DCI scheduling the at least one UL repetition.

Aspect 10 may be combined with any of aspects 1-2 or 4-9 and includes that the second indication of the at least one of the DMRS bundling activation or the DMRS bundling duration is indicative of the DMRS bundling duration, and where the second indication is received based on RRC signaling.

Aspect 11 may be combined with any of aspects 1-10 and includes that the at least one UL repetition corresponds to at least one PUCCH repetition.

Aspect 12 may be combined with any of aspects 1-11 and includes that the second indication of the at least one of the DMRS bundling activation or the DMRS bundling duration is received for at least one of each PUCCH format of a set of PUCCH formats or each configured PUCCH resource of a set of PUCCH resources.

Aspect 13 may be combined with any of aspects 1-10 and includes that the at least one UL repetition corresponds to at least one PUSCH repetition.

Aspect 14 may be combined with any of aspects 1-10 or 13 and includes that the second indication of the at least one of the DMRS bundling activation or the DMRS bundling duration is received for at least one of each PUSCH configured grant of a set of PUSCH configured grants or each PUSCH dynamic grant.

Aspect 15 may be combined with any of aspects 1-14 and includes that the maximum DMRS bundling duration is based on at least one a FDD band, a TDD band, or a TDD slot pattern.

Aspect 16 may be combined with any of aspects 1-2 or 4-15 and includes that the second indication of the at least one of the DMRS bundling activation or the DMRS bundling duration is indicative of the DMRS bundling duration, a start of the DMRS bundling duration corresponding to a beginning of a first UL transmission for the at least one UL repetition.

Aspect 17 may be combined with any of aspects 1-16 and further includes transmitting a UE capability message indicative of whether the UE is able to perform DMRS bundling, the first indication of the maximum DMRS bundling duration being transmitted to the network entity based on the UE being able to perform the DMRS bundling.

Aspect 18 is a method of wireless communication at a network entity, including: receiving, from a UE, a first indication of a DMRS bundling duration associated with a phase coherence for received DMRS; transmitting, to the UE based on the first indication of the maximum DMRS bundling duration, a second indication of at least one of a DMRS bundling activation or a DMRS bundling duration; and receiving at least one UL repetition including bundled DMRS based on the at least one of the DMRS bundling activation or the DMRS bundling duration.

Aspect 19 may be combined with aspect 18 and includes that the second indication of the at least one of the DMRS bundling activation or the DMRS bundling duration is indicative of the DMRS bundling activation, and the at least one UL repetition including the bundled DMRS is received based on transmission of the second indication.

Aspect 20 may be combined with any of aspects 18-19 and includes that the DMRS bundling duration is equal to the maximum DMRS bundling duration, and where the at least one UL repetition including the bundled DMRS is received for the maximum DMRS bundling duration.

Aspect 21 may be combined with any of aspects 18-19 and includes that the second indication of the at least one of the DMRS bundling activation or the DMRS bundling duration is indicative of the DMRS bundling duration, and where the second indication is transmitted based on RRC signaling.

Aspect 22 may be combined with any of aspects 18-21 and includes that the at least one UL repetition corresponds to at least one PUCCH repetition.

Aspect 23 may be combined with any of aspects 18-22 and includes that the second indication of the at least one of the DMRS bundling activation or the DMRS bundling duration is transmitted for at least one of each PUCCH format of a set of PUCCH formats or each configured PUCCH resource of a set of PUCCH resources.

Aspect 24 may be combined with any of aspects 18-21 and includes that the at least one UL repetition corresponds to at least one PUSCH repetition.

Aspect 25 may be combined with any of aspects 18-19 or 24 and includes that the second indication of the at least one of the DMRS bundling activation or the DMRS bundling duration is transmitted for at least one of each PUSCH configured grant of a set of PUSCH configured grants or each PUSCH dynamic grant.

Aspect 26 may be combined with any of aspects 18-25 and includes that the maximum DMRS bundling duration is based on at least one an FDD band, a TDD band, or a TDD slot pattern.

Aspect 27 may be combined with any of aspects 18-19 or 21-26 and includes that the second indication of the at least one of the DMRS bundling activation or the DMRS bundling duration is indicative of the DMRS bundling duration, a start of the DMRS bundling duration corresponding to a beginning of a first UL transmission for the at least one UL repetition.

Aspect 28 may be combined with any of aspects 18-27 and further includes receiving a UE capability message indicative of whether the UE is able to perform DMRS bundling, the first indication of the maximum DMRS bundling duration being received from the UE based on the UE being able to perform the DMRS bundling.

Aspect 29 is an apparatus for wireless communication including at least one processor coupled to a memory and configured to implement a method as in any of aspects 1-28.

Aspect 30 may be combined with aspect 29 and further includes at least one of an antenna or a transceiver that is coupled to the at least one processor.

Aspect 31 is an apparatus for wireless communication including means for implementing a method as in any of aspects 1-28.

Aspect 32 is a computer-readable medium storing computer executable code, the code when executed by at least one processor causes the at least one processor to implement a method as in any of aspects 1-28.

What is claimed is:

1. An apparatus for wireless communication at a user equipment (UE), comprising:
   memory; and
   at least one processor coupled to the memory and configured to:
      transmit, to a network entity, a first indication of a maximum demodulation reference signal (DMRS) bundling duration for maintaining transmit phase coherence for transmitted DMRS;
      receive, from the network entity, a second indication of at least one of a DMRS bundling activation or a DMRS bundling duration; and
      transmit at least one uplink (UL) repetition including bundled DMRS based on the at least one of the DMRS bundling activation or the DMRS bundling duration.

2. The apparatus of claim 1, wherein the second indication of the at least one of the DMRS bundling activation or the DMRS bundling duration is indicative of the DMRS bundling activation, and the at least one UL repetition including the bundled DMRS is transmitted upon receiving the second indication.

3. The apparatus of claim 2, wherein the DMRS bundling duration is equal to the maximum DMRS bundling duration, and wherein the at least one UL repetition including the bundled DMRS is transmitted for the maximum DMRS bundling duration.

4. The apparatus of claim 1, wherein the second indication of the at least one of the DMRS bundling activation or the DMRS bundling duration is indicative of the DMRS bundling duration, and the at least one UL repetition including the bundled DMRS is transmitted based at least on the DMRS bundling duration.

5. The apparatus of claim 4, wherein the at least one UL repetition including the bundled DMRS is transmitted for the DMRS bundling duration when the DMRS bundling duration is greater than or equal to two slots and is less than or equal to the maximum DMRS bundling duration.

6. The apparatus of claim 4, wherein when the DMRS bundling duration is greater than or equal to the maximum DMRS bundling duration, to transmit the at least one UL repetition the at least one processor is further configured to:
   transmit a first set of UL repetitions including first bundled DMRS for the maximum DMRS bundling duration; and
   transmit a second set of UL repetitions for a remainder of the DMRS bundling duration.

7. The apparatus of claim 6, wherein the second set of UL repetitions includes second bundled DMRS, separately bundled from the first bundled DMRS.

8. The apparatus of claim 6, wherein the second set of UL repetitions includes non-bundled DMRS.

9. The apparatus of claim 1, wherein the second indication of the at least one of the DMRS bundling activation or the DMRS bundling duration is indicative of the DMRS bundling activation, and wherein the second indication is received in downlink control information (DCI) scheduling the at least one UL repetition.

10. The apparatus of claim 1, wherein the second indication of the at least one of the DMRS bundling activation or the DMRS bundling duration is indicative of the DMRS bundling duration, and wherein the second indication is received based on radio resource control (RRC) signaling.

11. The apparatus of claim 1, wherein the at least one UL repetition corresponds to at least one physical uplink control channel (PUCCH) repetition.

12. The apparatus of claim 11, wherein the second indication of the at least one of the DMRS bundling activation or the DMRS bundling duration is received for at least one of each PUCCH format of a set of PUCCH formats or each configured PUCCH resource of a set of PUCCH resources.

13. The apparatus of claim 1, wherein the at least one UL repetition corresponds to at least one physical uplink shared channel (PUSCH) repetition.

14. The apparatus of claim 13, wherein the second indication of the at least one of the DMRS bundling activation or the DMRS bundling duration is received for at least one of each PUSCH configured grant of a set of PUSCH configured grants or each PUSCH dynamic grant.

15. The apparatus of claim 1, wherein the maximum DMRS bundling duration is based on at least one a frequency division duplex (FDD) band, a time division duplex (TDD) band, or a TDD slot pattern.

16. The apparatus of claim 1, wherein the second indication of the at least one of the DMRS bundling activation or the DMRS bundling duration is indicative of the DMRS bundling duration, a start of the DMRS bundling duration corresponding to a beginning of a first UL transmission for the at least one UL repetition.

17. The apparatus of claim 1, further comprising at least one of an antenna or a transceiver coupled to the at least one processor, wherein the at least one processor is further configured to transmit a UE capability message indicative of whether the UE is able to perform DMRS bundling, the first indication of the maximum DMRS bundling duration being transmitted to the network entity based on the UE being able to perform the DMRS bundling.

18. An apparatus for wireless communication at a network entity, comprising:
   memory; and
   at least one processor coupled to the memory and configured to:
      receive, from a user equipment (UE), a first indication of a maximum demodulation reference signal (DMRS) bundling duration associated with a phase coherence for received DMRS;
      transmit, to the UE, a second indication of at least one of a DMRS bundling activation or a DMRS bundling duration; and receive at least one uplink (UL) repetition including bundled DMRS based on the at least one of the DMRS bundling activation or the DMRS bundling duration.

19. The apparatus of claim 18, wherein the second indication of the at least one of the DMRS bundling activation or the DMRS bundling duration is indicative of the DMRS bundling activation, and the at least one UL repetition including the bundled DMRS is received based on transmission of the second indication.

20. The apparatus of claim 19, wherein the DMRS bundling duration is equal to the maximum DMRS bundling duration, and wherein the at least one UL repetition including the bundled DMRS is received for the maximum DMRS bundling duration.

21. The apparatus of claim 18, wherein the second indication of the at least one of the DMRS bundling activation or the DMRS bundling duration is indicative of the DMRS bundling duration, and wherein the second indication is transmitted based on radio resource control (RRC) signaling.

22. The apparatus of claim 18, wherein the at least one UL repetition corresponds to at least one physical uplink control channel (PUCCH) repetition.

23. The apparatus of claim 22, wherein the second indication of the at least one of the DMRS bundling activation or the DMRS bundling duration is transmitted for at least one of each PUCCH format of a set of PUCCH formats or each configured PUCCH resource of a set of PUCCH resources.

24. The apparatus of claim 18, wherein the at least one UL repetition corresponds to at least one physical uplink shared channel (PUSCH) repetition.

25. The apparatus of claim 24, wherein the second indication of the at least one of the DMRS bundling activation or the DMRS bundling duration is transmitted for at least one of each PUSCH configured grant of a set of PUSCH configured grants or each PUSCH dynamic grant.

26. The apparatus of claim 18, wherein the maximum DMRS bundling duration is based on at least one a frequency division duplex (FDD) band, a time division duplex (TDD) band, or a TDD slot pattern.

27. The apparatus of claim 18, wherein the second indication of the at least one of the DMRS bundling activation or the DMRS bundling duration is indicative of the DMRS bundling duration, a start of the DMRS bundling duration corresponding to a beginning of a first UL transmission for the at least one UL repetition.

28. The apparatus of claim 18, further comprising at least one of an antenna or a transceiver coupled to the at least one processor, wherein the at least one processor is further configured to receive a UE capability message indicative of whether the UE is able to perform DMRS bundling, the first indication of the maximum DMRS bundling duration being received from the UE based on the UE being able to perform the DMRS bundling.

29. A method of wireless communication at a user equipment (UE), comprising:
   transmitting, to a network entity, a first indication of a maximum demodulation reference signal (DMRS) bundling duration for maintaining transmit phase coherence for transmitted DMRS;
   receiving, from the network entity, a second indication of at least one of a DMRS bundling activation or a DMRS bundling duration; and
   transmitting at least one uplink (UL) repetition including bundled DMRS based on the at least one of the DMRS bundling activation or the DMRS bundling duration.

30. A method of wireless communication at a network entity, comprising:
   receiving, from a user equipment (UE), a first indication of a maximum demodulation reference signal (DMRS) bundling duration associated with a phase coherence for received DMRS;
   transmitting, to the UE, a second indication of at least one of a DMRS bundling activation or a DMRS bundling duration; and
   receiving at least one uplink (UL) repetition including bundled DMRS based on the at least one of the DMRS bundling activation or the DMRS bundling duration.

* * * * *